United States Patent
Heuer et al.

(10) Patent No.: US 7,464,098 B2
(45) Date of Patent: Dec. 9, 2008

(54) METHOD FOR RAPIDLY SEARCHING ELEMENTS OR ATTRIBUTES OR FOR RAPIDLY FILTERING FRAGMENTS IN BINARY REPRESENTATIONS OF STRUCTURED, FOR EXAMPLE, XML-BASED DOCUMENTS

(75) Inventors: Jörg Heuer, München (DE); Andreas Hutter, München (DE)

(73) Assignee: Siemens Aktiengesellschaft, Munich (DE)

( * ) Notice: Subject to any disclaimer, the term of this patent is extended or adjusted under 35 U.S.C. 154(b) by 373 days.

(21) Appl. No.: 10/482,357

(22) PCT Filed: Jun. 25, 2002

(86) PCT No.: PCT/DE02/02308

§ 371 (c)(1),
(2), (4) Date: Dec. 29, 2003

(87) PCT Pub. No.: WO03/001404

PCT Pub. Date: Jan. 3, 2003

(65) Prior Publication Data

US 2004/0193581 A1     Sep. 30, 2004

(30) Foreign Application Priority Data

Jun. 25, 2001  (DE)  ................... 101 30 525
Mar. 14, 2002  (DE)  ................... 102 11 385

(51) Int. Cl.
*G06F 7/00* (2006.01)

(52) U.S. Cl. ............ 707/101; 707/3; 715/234

(58) Field of Classification Search .......... 707/3, 707/101; 715/234
See application file for complete search history.

(56) References Cited

U.S. PATENT DOCUMENTS

| | | | | |
|---|---|---|---|---|
| 6,094,649 A * | 7/2000 | Bowen et al. | ................. | 707/3 |
| 6,745,206 B2 * | 6/2004 | Mandler et al. | .......... | 707/104.1 |
| 6,782,380 B1 * | 8/2004 | Thede | ........................ | 707/3 |
| 6,804,677 B2 * | 10/2004 | Shadmon et al. | ............ | 707/101 |
| 6,825,781 B2 * | 11/2004 | Seyrat et al. | .................. | 341/50 |

(Continued)

FOREIGN PATENT DOCUMENTS

DE        10064663.8        12/2000

(Continued)

OTHER PUBLICATIONS

Text of ISO/IEC FCD 15938-1 Information technology—Multimedia content description interface—Part 1 Systems. pp. 21-27.*

(Continued)

*Primary Examiner*—Robert Timblin
(74) *Attorney, Agent, or Firm*—Baker Botts L.L.P.

(57) ABSTRACT

A method serves to encode textual paths for indexing and querying structured, for example, XML-based documents and serves to execute and improved filtering of binarily represented XML documents. A development of the method results in all indices being identical even in the event that a polymorphism is inserted therein. When storing these textual paths for indexing or querying, only one smaller volume of data has to be stored or transmitted. A comparison of this data can also subsequently ensure more rapidly during a query since the volume of data to be compared is smaller.

6 Claims, 1 Drawing Sheet

U.S. PATENT DOCUMENTS

| | | | |
|---|---|---|---|
| 2002/0123993 A1* | 9/2002 | Chau et al. | 707/5 |
| 2002/0138517 A1* | 9/2002 | Mory et al. | 707/513 |
| 2002/0143521 A1* | 10/2002 | Call | 704/1 |
| 2004/0107297 A1 | 6/2004 | Heuer et al. | |
| 2004/0107402 A1* | 6/2004 | Seyrat et al. | 715/513 |
| 2004/0139393 A1 | 7/2004 | Heuer et al. | |
| 2004/0186841 A1 | 9/2004 | Heuer et al. | |

FOREIGN PATENT DOCUMENTS

| | | |
|---|---|---|
| DE | 10104537.9 | 2/2001 |
| DE | 10109547.3 | 2/2001 |
| DE | 10047338 | 4/2002 |

OTHER PUBLICATIONS

"Text of ISO/IEC FCD 15938-1 Information Technology—Multimedia Content Description Interface—Part 1 Systems", Mar. 2001, pp. 1-2, I-V, 6-58.

XP-002248313—McHugh et al., "Indexing Semistructured Data", Jul. 18, 2003.

XP-002219530—"XML Path Language (XPath) Version 1.0" Nov. 16, 1999.

XP-002248314—Goldman et al, "DataGuides: Enabling Query Formulation and Optimization in Semistructured Databases", Aug. 26-29, 1997, pp. 436-445.

ISO/IEC FDIS 15938-1 Information Technology - Multimedia content description interface: Systems, ISO.IEC JTC 1 SC29/WG11/N4285, Sydney, Jul. 2001 pp. 1-88.

dbXML - XML Database Application Server, version 0.4, The dbXML group 2000, pp. 1-20 http:/www.dbxml.org/docs/CoreSpecs.pdf.

J. Robie et al., XML Query Language (XQL), 1998, pp. 1-43http://www.w3.0rg/TandS/QL/QL98/pp/xql.html.

XML Schema Part 1: Structures, W3C Recommendation May 2, 2001 pp. 1-160, http://www.w3.org/XML/Schema.

* cited by examiner

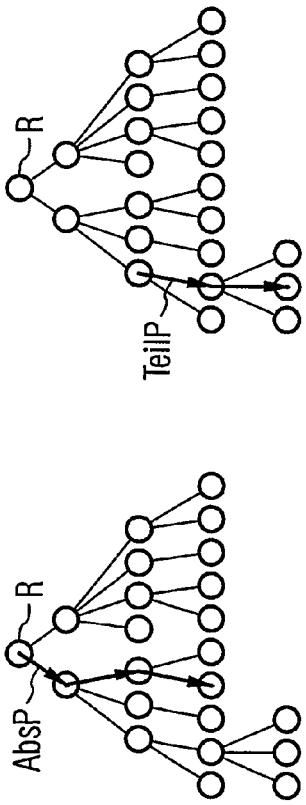

METHOD FOR RAPIDLY SEARCHING ELEMENTS OR ATTRIBUTES OR FOR RAPIDLY FILTERING FRAGMENTS IN BINARY REPRESENTATIONS OF STRUCTURED, FOR EXAMPLE, XML-BASED DOCUMENTS

FIELD OF TECHNOLOGY

The invention relates to methods whereby structured documents, for example XML-based or SGML-based documents, are queried based on textual path expressions. Textual paths are, for example, context paths as described in [1] for instance, or textual path details as specified in [2] for instance, for indexing and querying structured, for example XML-based, documents.

BACKGROUND

A system is known from [3] whereby textual paths are used for indexing the contents of an XML document. Absolute paths and partial paths to each element in a document are here stored in, for instance, a hash table. These elements are then referenced based on the storage address in the stored document.

A query language is furthermore known from [4] which is able to formulate queries, to a database for example, based on textual path expressions.

The object of the invention is to disclose methods for searching elements or for filtering fragments in binary representations of methods according to the invention.

SUMMARY

The invention relates essentially to a method for encoding textual paths for indexing and querying structured, for example XML-based, documents and for the improved filtering of XML documents represented in binary form. A result of applying the method is that the indices will also be identical if polymorphism is used. Only a small volume of data has to be stored or transmitted when said textual paths for indexing or querying are stored. This data can consequently also be compared more quickly during a query as the volume of data being compared is smaller.

The invention is explained in greater detail below with the aid of exemplary embodiments shown in the drawings.

BRIEF DESCRIPTION OF THE DRAWINGS

FIGS. 1A to 1C show the structure of an encoded path, of a lossy encoded partial path, and of a loss-free partial path, and FIGS. 2A and 2B are a graphical representation of an absolute path and of a partial path.

DETAILED DESCRIPTION

As described at the beginning, textual paths can be used for indexing the contents of an XML-based document so that the data which is to say similarly to the manner indicated in [1].

In each case in schematic form, FIG. 1A shows encoding according to the invention of an absolute path, FIG. 1B shows the encoding of a lossy partial path, and FIG. 1C shows encoding according to the invention of a loss-free partial path.

In order to distinguish these three types of paths, a path type PT is signaled with two bits at the start of each of the three codes shown by way of example.

If a path proceeding from a root node of an underlying data structure is possible for indexing, encoding, as shown in FIG. 1A, can only take place by specifying the path type PT as an absolute path followed by the absolute path AP. FIG. 2A shows such an absolute path AbsP proceeding from a root node R. It is worth mentioning here that path encoding is permitted exclusively using schema branching codes SBC and tree branching code TBC, although, for example according to the definition in [1], what are termed position codes would have to be inserted.

FIG. 2B shows a tree-type data structure with a partial path TeilP which differs from an absolute path in not proceeding from a root node R. In the case of partial path encoding the first node in the path is only specified by the type code in relation to a general base type, e.g. the ur-type, this means that, as shown in FIG. 1B, after indication of the path type PT an absolute type code ATC is coded. The residual path can then be coded by indicating a relative path RP as shown in [1] and where applicable can be modified as shown in the first case. However, this encoding of the path is lossy, because the name of the first node cannot be determined, but only the data type. However, this is not of any relevance for many use cases.

Loss-free encoding retaining the described properties can, however, be achieved by means of the encoding shown in FIG. 1C which, in addition to specify the path type PT, the absolute type code ATC, and the relative path RP, also contains the number N of types or child elements followed by at least one absolute type AT or a tuple from an absolute type AT and a schema branching code SBC of a child element. The number NT indicates the number of nodes which can contaon the specified partial path proceeding from a child element. The type codes of these node types AT, AT', ... refer to the same basic type and are arranged, for example, in ascending order according to the codes. By specifying the schema branching codes SBC, ... it is possible to signal specific child elements from which the partial path proceeds if several child elements of the type with the absolute type code ATC of the partial path TeilP have been declared.

Encoding of the paths in an index by means of the method according to the invention is advantageous because often no decoding or only transcoding of documents transmitted in encoded form is required during indexing. The storage requirements for the index can also be reduced, which allows queries to be executed faster or which reduces the required computing effort. Encoding of the paths in database querying is advantageous because the volume of data transmitted from the device accepting In an advantageous embodiment of the method according to the invention, textual paths for indexing elements and/or attributes are encoded in such a way that the data types which are instanced in the path and which are derived through polymorphism are uniquely replaced by standardized data types, each standardized data type being specified in a manner whereby, proceeding from the basic data type of the respective data type, a data type is searched which contains the element or attribute following in the path and which can be uniquely determined with reference to its derivation from the basic type. As a result, the encoded textual path is uniquely recognized by its bit pattern and the searched elements and/or attributes can be located with this in the encoded, XML-based document.

This standardizing can be applied generally to textual paths, which is to say not just to textual paths for indexing but also to context paths, as described in [1], for encoding. The advantage of said standardizing is that identical textual paths of different documents are standardized to a single binary representation even if the nodes in the document which are contained in the path differ from the data type. This means just a single bit pattern per path has to be taken into account during a search for textual paths with the aid of bit patterns of the encoded paths. A final further advantage is that the resulting bit patterns are generally shorter than corresponding The following references are cited in this document, and each of the listed references are incorporated by reference in their entirety herein:

[1] "ISO/IEC FCD 15938-1 Information technology-Multimedia content description interface: Systems", /7, ISO/IEC JTC 1 SC29/WG11/N4001, Singapore, March 2001

[2] XML Path Language, Version 1.0, W3C Recommendation, 16 Nov. 1999, http://www.w3.org/TR/xpath.

[3] dbXML-XML Database Application Server, Version 0.4, The dbXML Group, 2000, http://www.dbxml.org/docs/CoreSpecs.pdf.

[4] J. Robie, J. Lapp, D. Schach, XML Query Language (XQL), 1998, http://www.w3.org/TandS/QL/QL98/pp/xgl.html.

[5] XML Schema Language, XML Schema Part 1: Structures, §6, W3C Recommendation, 2 May 2001 http://www.w3.org/XML/Schema.

The invention claimed is:

1. A method for searching of elements in binary representations of structured XML-based documents, comprising the steps of:
    encoding a textual path for indexing elements or attributes, wherein the path comprises data types;
    replacing at least one of the data types, that are instanced in the path and which are derived through polymorphism, with standardized data types, wherein the respective standardized data type is obtained by
        deriving a basic data type of the respective data type, and
        searching a data type to establish that the searched data type contains the element or attribute following in the path and that is uniquely determined with reference to its derivation from the basic data type;
    providing a unique identification for the textual path using a bit pattern after encoding, wherein the bit pattern includes the searched elements or attributes.

2. The method according to claim 1, wherein after the step of searching the data type to establish the searched data type contains the element or attribute following in the path and that is uniquely determined with reference to its derivation from the basic type, the standardized data type is further defined by having the lowest or highest type code or the lowest or highest number of inheritance steps proceeding from the basic type.

3. The method according to claim 1, wherein the textual path is encoded by specifying a path type and an encoded absolute path, without the use of position codes.

4. The method according to claim 1, wherein the textual path is encoded by specifying a path type, an absolute type code, and an encoded relative path, without the use of position codes.

5. The method according to claim 4, wherein the textual path is encoded by additionally specifying a number of types and by means of a number of tuples, determined by the number of types from a respective absolute type and a respective schema branching code.

6. A method for filtering fragments in binary presentations of structured XML-based documents, comprising the steps of:
    encoding a context path for indexing elements or attributes wherein the path comprises data types;
    replacing at least one of the data types that are instanced in the path and which are derived through polymorphism with standardized data types, wherein the respective standardized data type is obtained by
        deriving a basic data type of the respective data type, and
        searching a data type to establish that the searched data type contains the element or attribute following in the path and that is uniquely determined with reference to its derivation from the basic data type;
    providing a unique identification for the context path using a bit pattern after encoding, wherein the bit pattern includes the searched elements or attributes.

* * * * *